Feb. 4, 1969           E. J. LEVY           3,425,807
                      PYROLYSIS SYSTEM
Filed April 15, 1965                    Sheet 1 of 4

INVENTOR.
EUGENE J. LEVY
BY Charles A. Weigel, Jr.

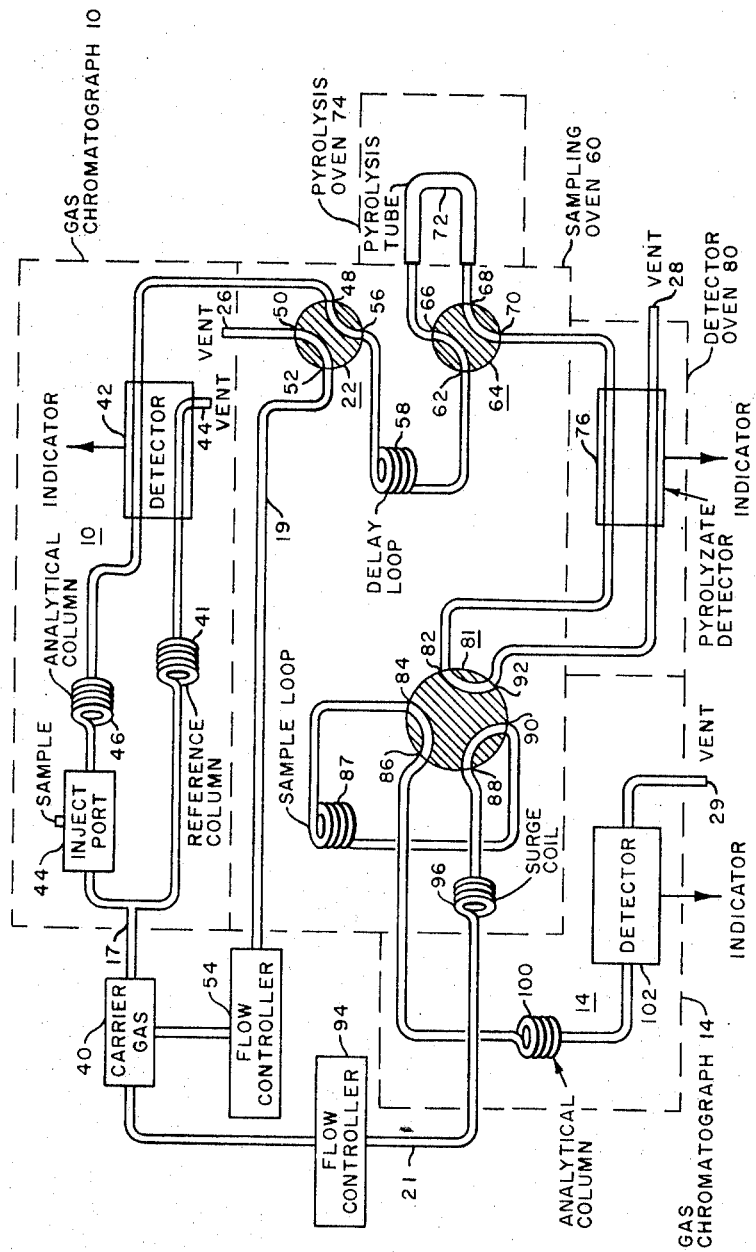

INVENTOR.
EUGENE J. LEVY

United States Patent Office 3,425,807
Patented Feb. 4, 1969

3,425,807
PYROLYSIS SYSTEM
Eugene J. Levy, Oxford, Pa., assignor, by mesne assignments, to Hewlett-Packard Company, Palo Alto, Calif., a corporation of California
Filed Apr. 15, 1965, Ser. No. 448,448
U.S. Cl. 23—232        22 Claims
Int. Cl. G01n 21/02

ABSTRACT OF THE DISCLOSURE

A method for identifying the components of a sample mixture utilizing two gas chromatographic columns and a pyrolysis chamber. The sample is separated in a first chromatographic column. One of the separated components is introduced into a second flow system containing an open pyrolysis tube. This separated sample component is pyrolized and the resulting pyrolysis products introduced into a third flow system which includes the second chromatographic column. The second column separates the pyrolysis products, which, when individually detected, are indicative of the identity of the sample component pyrolyzed.

---

This invention relates to a system and method for identifying substances and, more particularly, to a system and method of material identification by thermal decomposition. A particular feature of the system of this invention is its ability to handle relatively small quantities of the substance to be identified.

In recent years gas chromatography has proven to be an extremely useful and effective separating technique by which known sample mixtures may be separated into their components. The relative quantity of each component may be readily determined with the aid of any one of many gas detectors. While quite satisfactory for quantitative analyses, difficulties are encountered in identifying the separated components. To identify such components, resort is usually had to whatever auxiliary analytical tools are available. Optical or mass spectrometers have been used for such identification. Mass spectrometers are quite costly. Infrared and ultra violet spectra can also be used, but in many cases give only limited information about the size and structure of the molecule under test. The infrared spectroscopic method has the disadvantage of requiring relatively large quantities of the sample for a definite identification.

It is an object of this invention to facilitate the identification of substances using relatively low cost yet accurate systems.

Keulemans and Perry described an identification system using a pyrolysis tube and a gas chromatograph in a paper entitled "Identification of Hydrocarbons by Thermal Cracking" and presented at the fourth International Gas Chromatography Symposium, Hamburg, Germany (1962). A preprint of the Keulemans et al. paper was published in 1962 in London by Butterworths. As proposed by Keulemans et al., a sample is passed by means of a carrier gas through a continuous flow system including a pyrolysis tube and a gas chromatograph located downstream of the pyrolysis tube. The resulting gaseous decomposition products are separated by the gas chromatograph and individually detected and recorded as a chromatogram. By determining the relative quantities of the decomposition products, distinctive and reproducible patterns, termed "cracking patterns," are obtained. An advantage of the Keulemans et al. proposal is that the observed cracking pattern is closely related to the carbon skeleton of the parent organic molecule.

One of the basic problems encountered in identifying hydrocarbons by thermal cracking is that substantially all recombination reactions should be eliminated to avoid complication of the otherwise meaningful cracking patterns. It is known that these recombination reactions can be substantially eliminated by proper choice of operating parameters in the pyrolysis apparatus.

Because of their different operating requirements, however, it is difficult if not impossible to achieve optimum operating conditions both for pyrolysis and subsequent pyrolyzate separation by gas chromatography. To obtain better reproducibility of the cracking patterns, the parameter's pressure, temperature, and residence time of the sample in the pyrolysis unit must be maintained within certain carefully controlled limits. The percentage decomposition of the sample is directly proportional to its residence time in the pyrolysis tube. If the residence time or pressure of the sample component in the pyrolysis unit is excessive, secondary or recombination reactions occur which distort the cracking pattern. Different limits for the variables apply for the chromatographic separation. If pyrolysis conditions are optimized, the conditions for the subsequent gas chromatograph separation are not. The reverse is also true.

Another deficiency of the known pyrolysis systems and methods is that small samples, preferably less than 1 ml. must be employed else reactions between the fragment radicals and undecomposed molecules will complicate the cracking patterns. This creates a problem because of the difficulty of determining sample weight or volume and accurately introducing all of such weight or volume through the pyrolysis tube. An additional problem encountered in prior pyrolysis systems is that the sample pyrolyzed may not be pure. Impurities impair the accuracy and reproducibility of the results.

Catalytic cracking systems and methods have not proven entirely satisfactory inasmuch as they tend to be dependent on sample size.

It is, therefore, an object of this invention to overcome many of the disadvantages of the prior art thermal cracking qualitative identification systems and methods.

An additional object of this invention is to provide an improved system for identifying samples of substances that are substantially independent of sample size over a relatively wide range of sample sizes.

Another object of this invention is to provide an improved system for identifying organic substances which system provides stable, repeatable information regarding the carbon skeleton of the parent molecule of the substance.

Still another object of this invention is to more efficiently and accurately identify organic molecules of samples by thermal cracking.

A further object of this invention is to provide an improved method of identifying samples of substances by thermal cracking.

The method of this invention contemplates identifying a sample component by introducing the sample mixture into a first flow stream, separating the components of the sample mixture, introducing one of the separated components into a second flow stream, pyrolyzing the thus separated component, introducing the pyrolysis products into a third flow stream, and separating and detecting the individual pyrolysis products to provide a cracking pattern which is truly indicative of the sample component.

A system for performing the method of this invention includes first and third independent flow systems or streams each comprising a gas chromatograph separating column. A second independent flow system or stream, which comprises an open, noncatalytic pyrolysis tube, interconnects the first and third flow systems. Separate sources of carrier gas are provided for each of the flow streams. Valves are employed to interconnect the flow streams to permit a discrete portion of the first flow stream (the gas chromatograph effluent) to be sampled and introduced into the second flow stream for pyrolysis.

The pyrolyzate from the pyrolysis tube is introduced into the third flow stream (the second gas chromatograph) for separation and detection of the individual thermal decomposition products. A plot of the detector output signal amplitude vs. time (termed a chromatogram) provides a visual thermal cracking pattern which is related to the carbon skeleton of the parent molecule of the individual sample component analyzed. This affords a means of identifying the parent molecule itself.

The novel features that are considered characteristic of this invention are set forth with particularity in the appended claims. The invention, itself, however, both as to its organization and method of operation, as well as additional objects and advantages thereof, will best be understood from the following decsription when read in connection with the accompanying drawings, in which:

FIGURE 3 is a detailed part schematic and part block diagram of the system of FIG. 2 but with certain switching valves in their second position;

Figure 6:
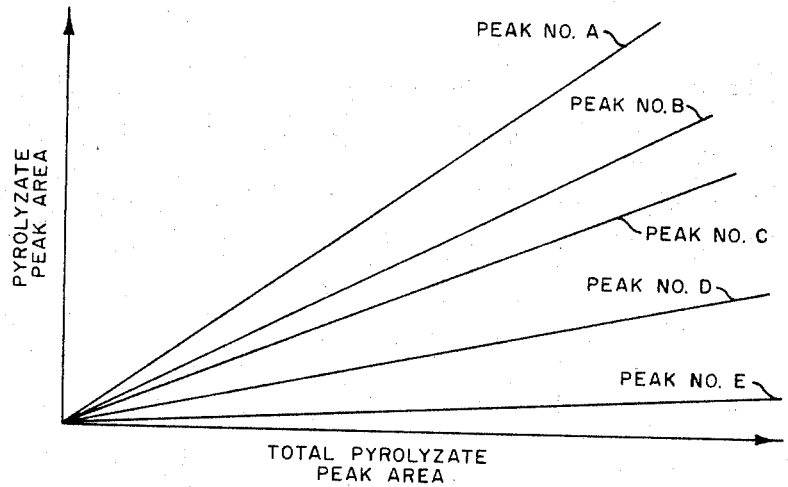
Figure 5:
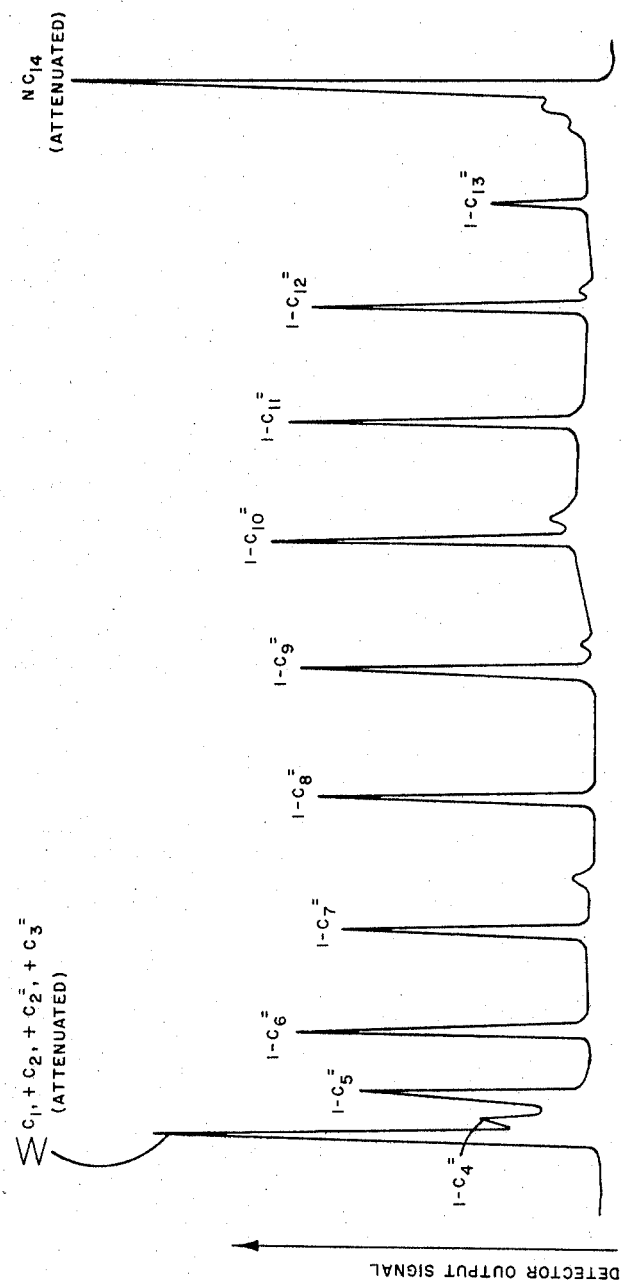

FIGURE 5 is an illustration of a typical thermal cracking pattern in which the amplitude of the detector output signal denoting each of the separated pyrolyzate products of a typical organic material, n-tetradecane, is plotted as a function of time; and FIGURE 6 is a plot of the area under recorded pyrolyzate peaks as the ordinate vs. the total area of the pyrolyzate peaks as the abscissa for a typical cracking pattern illustrating the independence of the relative peak areas as a function of the quantity of the substance pyrolyzed.

The method of this invention contemplates converting the sample of material to be identified into fluid state (in either vapor or gaseous form) and introducing it successively into different fluid flow streams for separation into its components, pyrolysis of one of such components, and separation of the pyrolyzate into its several decomposition products. The relative quantities of the individual pyrolysis products as compared to the total quantity of the decomposition products is indicative not only of the identity of the pyrolyzed sample component, but also is indicative of its carbon structure in the case of organic materials. The many advantages of this method may be more readily seen from a consideration of a system for performing the method as is illustrated in FIG. 1.

Figure 1:
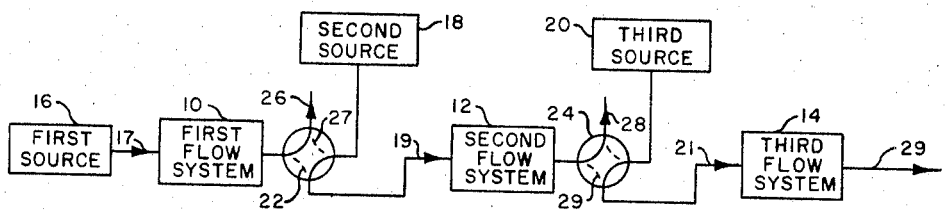
FIGURE 1 is a generalized block diagram of an arrangement of isolated flow systems or streams that may be employed to perform the method of this invention.

In FIG. 1 there may be seen first, second, and third independent fluid flow systems or streams 10, 12, and 14, respectively. Each flow system is supplied by first, second, and third independent and isolated fluid flow streams 17, 19, and 21, respectively, derived from first, second, and third sources 16, 18, and 20, respectively. The sources 16, 18, and 20 may, for example, be sources of an inert carrier gas such as helium. In this manner the streams through each flow system may have such flow rate, pressure, and temperature as may be desirable to optimize the operation of the particular system. Portions of the first and second streams 17 and 19 may be selectively introduced into the second and third streams 19 and 21, respectively, by means of two-way, four port switching valves 22 and 24, respectively. Both valves 22 and 24 are adapted to interconnect adjacent pairs of ports, i.e. first to second and third to fourth ports when in their first switching position illustrated by the solid lines and first to fourth and second to third ports when in their second switching position illustrated by the dotted lines. The valves may be any suitable type, either linear or rotary motion valves. Suitable valves are available, for example, from Carle Instruments, Inc., Anaheim, Calif. The valves are illustrated symbolically as rotary disc valves.

The first four-port valve 22 when in its first switching position interconnects the first stream 17 of the first flow system 10 to a vent 26 to atmosphere and the second stream 19 from the second source 18 to the second flow system 12. The switching valve 22 may be rotated to its second position, illustrated by the dotted lines 27, to connect the first stream 17 directly to the second stream 19 and the second source 18 to the vent 26. Any portion of the first flow stream 17 may be sampled and introduced into the second flow system.

In like manner the second four-port valve 24 when in the first switching position as illustrated, interconnects the second flow system to a vent 28 to atmosphere and directs the third stream 21 through the third flow system 14. When the second valve 24 is rotated to its second switching position, illustrated by the dotted lines 29, the third stream 21 is connected to the vent 28 and the second flow stream 19 of the second flow system 12 is connected directly into the third flow system 14. Any desired portion of the second stream 19 through the second flow system 12 may be introduced in to the third flow system 14.

By this arrangement each of the separate flow systems 10, 12, and 14 are isolated and may have their own temperature, pressure, and flow rate as may be desired to optimize each system. To perform the method of the present invention, the first flow system 17 is a conventional programmed temperature gas chromatograph. Samples of substances to be analyzed are vaporized and introduced into the gas chromatograph and separated into their constituent components in conventional manner. When the desired component, which may be a relatively small part of the original sample begins to elute from the chromatograph, the first valve 22 is switched to its second position, and the desired component passed into the second flow system 12. By this arrangement, relatively small quantities of a particular sample component may be introduced accurately and reproducibly into the second flow system without loss. The sample component remains in vapor or gaseous state and facilitates handling of small quantities. Many known pyrolysis systems inject the sample directly into the pyrolysis tube. It is difficult using such techniques to avoid sample contamination. This invention obviates this difficulty by retaining the separated sample component in gaseous or vapor state and introducing it directly into the pyrolysis tube. The first valve 22 is returned to its first position when the desired component has eluted to again isolate the first and second flow systems.

The second flow system 12 preferably is a pyrolysis tube in which the desired component of the sample is thermally decomposed. In contrast to the first flow system, the second flow system operates at relatively low pressure and fluid flow rate, but at relatively high temperature to achieve pyrolysis with reduced secondary reactions. The introduction of small quantities of the sample component permitted by handling the sample in gaseous or vapor state, permits the pyrolysis to take place with substantial independence of sample size.

The third flow system 14 may be another analytical gas chromatograph. Again the second valve 24 is switched from its first to its second position and back again to introduce the pyrolyzate products into the third flow system for separation in time and detection. The fluid temperatures, pressures, and flow rates may vary considerably in the third flow system 14 from those in the second flow system 12. This variation is necessary to optimize the operating conditions of the gas chromatograph.

The decomposition products from the second flow systems are separated by the analytical chromatograph comprising the third flow system 14 and then detected. The resulting variations in the chromatograph detector's output signal amplitude are recorded on a suitable indicating device such as a recorder and provide as illustrated in FIG. 5 a chromatogram of the decomposition pattern. It may be noted by reference to FIG. 5 that this chromatogram or thermal decomposition pattern includes a number of peaks each of which correspond to a different carbon number decomposition product. The ratios of these pyrolysis products to each other and to the total pyrolysis products have been found to be uniquely indicative of the pyrolyzed sample components and in the case of organic compounds to the carbon skeleton of the parent molecule as indicated by the Rice-Herzfeld theory.

According to this theory, initial free radicals are obtained by thermally splitting of the parent molecule at its weakest link. Next one of these free radicals abstracts H from the parent compound to form a small saturated molecule and a new free radical. Both radicals may so react. Also free radicals of the type $RCH_2—CH'_2$ can stabilize themselves by splitting off ethylene and forming an olefin $RCH_2—CH_2 \cdot \rightarrow R + CH_2 = CH_2$. Secondary radicals ($R—CH_2—CH—CH_2—R'$) will split out more complex olefins as will tertiary radicals ($R'R''R'''C \cdot$). This chain propagation terminates through association or disproportionation of radicals. The Rice-Herzfeld theory is described in a paper entitled "Mechanism of Some Chain Reactions" by F. O. Rice and K. F. Herzfeld in the Journal of the American Chemical Society, vol. 56, p. 284, published 1934.

The Rice free radical mechanism for the thermal decomposition of a typical normal paraffin, such as n-butane requires a *primary decomposition* of the molecule to form a free radical:

$$(P) C_4H_{10} \rightarrow CH_3 \cdot + CH_3CH_2CH_2'(R \cdot)$$

The free radical $R \cdot$ e.g. ($CH_3'$) then abstracts a hydrogen from the n-butane molecule, from either the primary or secondary C—H bond:

For primary CH—

$$(A_1) C_4H_{10} + R \cdot \rightarrow RH + CH_3—CH_2$$
$$—CH_2—CH_2 \rightarrow RH + C_2H_4 + CH_3—CH_2 \cdot$$

For secondary CH—

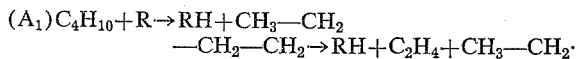

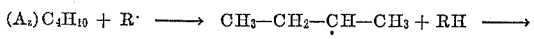

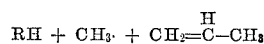

In reaction $A_1$, after formation of the n-butyl free radical, a secondary bond cleavage occurs $\beta$ to the site from which the hydrogen has been abstracted, splitting out ethylene and regenerating the n-alkyl or ethyl free radical. For larger molecules such as n-pentane, n-hexane, etc. the free radical will continue to split out ethylene in successive steps until the moleclue is reduced to a $CH_3—CH_2 \cdot$ or a $CH_3 \cdot$ by continued dissociation. In the reaction $A_2$, however, after the abstraction of hydrogen from a secondary C—H bond, the isobutyl radical, cleaves $\beta$ to the point of abstract, dissociated a methyl radical and stabilizing itself by rearrangement to a 1-olefin $CH_2 = CH—CH_3$.

Returning now to FIG. 5 which is a reproduction of an actual chromatogram of the pyroylsis products for $nC_{14}$, examination shows approximately equal area for all $\alpha$ olefinic peaks $C_6-C_{12}$, a small peak at $C_{13}$ and a composite peak of $C_1-C_3$ which is quite large relative to the peaks of the rest of the chromatogram. In FIG. 5 the $1-C_6=$ refers to 1-hexene and $1-C_7=$ refers to 1-heptene. This is the approximate composition as that predicted by Rice's theory for straight chain higher molecules n-alkane pyrolyzed under high temperature low press conditions. A unique cracking pattern for other molecules can be obtained, which is dependent upon the particular structure of that molecule. This pattern serves as a means for identifying the *structure* of that molecule.

Figure 2:
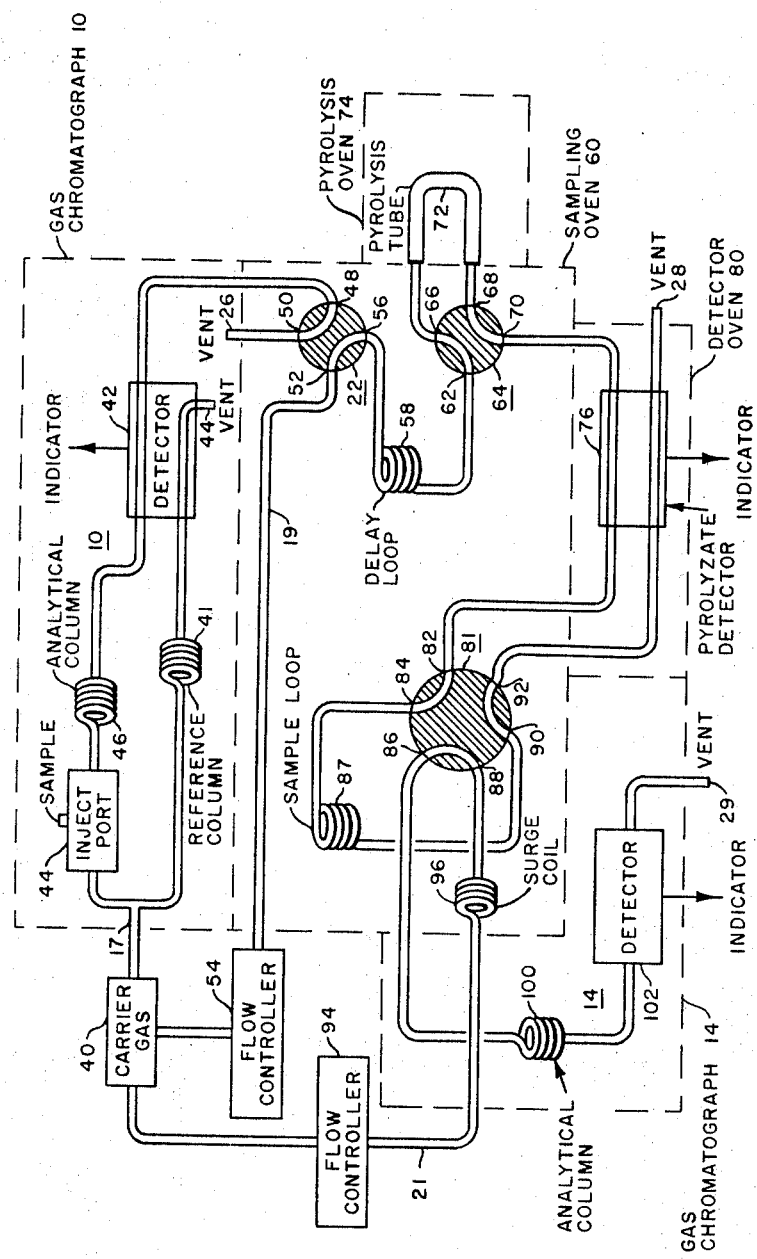
FIGURE 2 is a detailed part schematic and part block diagram of the arrangement illustrated in FIG. 1.

A detailed and modified system capable of performing the method of this invention is illustrated in FIGS. 2 and 3. The first flow system 10 of FIG. 1 is illustrated as gas chromatograph 10, the second flow system 12 is illustrated as including those stream switching, sampling and pyrolyzing elements with ovens 60, 74, and 80 as will be described, and the third flow system 14 is illustrated as including the second gas chromatograph 14. A source 40 of carrier gas, such as Helium which provides the first flow stream 17, may be connected to a gas chromatograph 10 which may be a conventional programmed temperature unit. The chromatograph 10 preferably should have a nondestructive detector 42, e.g., a thermal conductivity detector 42 or, in the alternative, an effluent splitter and flame detector of conventional type may be employed. The carrier gas is supplied through suitable tubing to a reference column 41 and thence through the reference side of the detector 42 to vent 44. The remainder of the carrier gas is directed through a suitable injection port 44 and analytical separating column 46. Both carrier gas flow streams through the reference and analytical columns 41 and 46 may be flow regulated by flow controllers (not shown). The output of the analytical column 46 is connected through the analytical side of the detector 42 and thence to a first port 48 of the two-way, four-port switching valve 22 (FIGS. 1, 2, and 3) through tubing. All tubing employed may be stainless steel or other suitable tubing as desired.

The second port 50 of the valve 22 is connected to vent 26. The third port 52 of valve 22 receives the second fluid stream 19 from a flow controller 54 which regulates the carrier gas flow rate from the carrier gas source 40. The fourth and final port 56 of the valve 22 is connected to a delay loop 58 which may be a coil of stainless steel tubing.

The valve 22 as well as the delay loop 58 are both enclosed within a sampling oven 60 which preferably may be adjusted to maintain any desired temperature. The delay loop 58 should have sufficient volume to contain the entire amount of any given eluted sample component from the gas chromatograph 10 in vapor or gaseous form. The sample loop 58 and valve 22 are heated to prevent condensation of the eluted sample component. The first valve 22 in its second or sampling position is illustrated in FIG. 3.

From the delay loop 58, the second fluid stream 19 is directed to the first port 62 of a second two-way, four-port switching valve 64 of similar type to the first valve 22. The four ports of the second valve 64, numbered 62, 66, 68, and 70, respectively, direct, when the valve 64 is in a first position, the second fluid stream 19 from the delay loop 58 through an open quartz pyrolysis tube 72 enclosed within a pyrolysis oven 74 and thence through suitable tubing to one side of a thermal conductivity detector 76. When in its second switching position, the second valve 64 by-passes the pyrolysis tube 72 and passes the second fluid stream 19 from the delay loop 58 directly to the pyrolyzer detector 76. The second valve 64 may be omitted if desired and the delay loop 58 connected through the pyrolysis tube 72 directly to the detector 76.

The pyrolyzate detector 76 preferably is enclosed in a separate detector oven 80 as is customary in gas chromatography to facilitate precise control of the detector temperature. The pyrolyzate detector 76 may be included within the sampling oven 60. From the second detector 76, the second flow stream 19 is directed to the first port 82 of a two-position, six-port switching valve 81 (although a rotary valve is illustrated diagramatically, an axial movement valve of a type described in an article by E. J. Levy, E. D. Miller, and W. S. Beggs, entitled, "Application of Time of Flight Mass Spectrometry and Gas Chromatography to Reaction Studies" and published in Analytical Chemistry, vol. 35, p. 946, July 1963, may be employed if desired) which selectively interconnects the fluid streams directed to different adjacent pairs of its six ports 82, 84, 86, 88, and 90 together.

In the first switch position as illustrated in FIG. 2 (the second switch position is illustrated in FIG. 3), the second stream 19 entering the first port 82 is passed out of the second port 84 to a sample loop 87 which may, for example, be open stainless steel tubing wound in the form of a helix. The sample loop 87 must be of sufficient capacity to contain at one time all of the pyrolysis products of the pyrolysis tube 72, in their vapor or gaseous form. From the sample loop 87, the second fluid stream 19 passes back through the fifth port 90 of the six-port valve 81, thence out of the sixth port 92 and through the remaining reference side of the detector 76 and thence to vent 28 to atmosphere. The sample loop 87, six-port valve 81, and detector 76 are all enclosed within ovens 60 and 80 and comprise the second flow system 12 (FIG. 1). This permits the separated sample component from the first flow system to be retained in vapor form throughout valve switching, pyrolysis, etc. and imposes no limits on minimum sample size.

In the second switching position (FIG. 3), valve 81 interconnects those pairs of ports 84–86, 88–90, and 82–92 illustrated as adjacent and not connected in FIG. 2 so as to introduce the sample contained in gaseous or vapor form in the sample loop 87 into the third flow system. The switching valve 81 in the second switching position is illustrated in FIG. 3.

The third flow stream 21, is derived from a second flow controller 94 which in turn is connected to receive carrier gas from the carrier gas supply 40. Carrier gas forming the third flow stream 21 passes through a surge coil 96 which is enclosed within the sampling oven 60. The surge coil 96 aids in preheating the carrier gas in the third flow stream 21 and may comprise a suitable length depending on the volume of the sample loop 87 as will be described. From the surge coil 96, the third stream 21 continues via tubing, to the fourth port 88, through the switching valve 81, thence out the third port 86 to an analytical column 100 and detector 102 of the second gas chromatograph which comprise the third flow system 14.

The second chromatograph should have a carrier gas flow rate as high as generally is obtainable from a 50–100 pound per square inch (p.s.i.) helium line and desirably should be a programmed temperature, dual column, dual flame, gas chromatograph capable of highly reproducible temperature programming (only a single column unit is illustrated). Suitable chromatographs for use for the first and third flow systems 10–14 are available from F & M Scientific Corporation and are designated Models 810. In each case the chromatograph detectors 42 and 102 may be enclosed in separate ovens to insure accurate temperature control. Each of the chromatograph detectors 42 and 102, as well as the pyrolyzate detector 76, may be connected to suitable indicating devices such as chart type potentiometric recorders which provide a visual recording of the amplitude variations of the respective detector output signals as a function of time.

In one embodiment of the invention that was successfully operated, the delay loop 58 was constructed of 3/16" stainless steel tubing having a length to provide a delay volume of 50 milliliters. The sample loop was of similar dimension. All connecting tubing employed was 1/8" stainless steel and the flow rate in the second stream 19 through the pyrolysis tube 72 was adjusted by flow controller 54 to be 6 cc. per minute. The quartz pyrolysis tube was 45 centimeters in length and 3/16" in diameter. The surge coil 96 was 15 feet of 3/16" stainless steel tubing. The flow rate of the first flow stream 17 was adjusted to be approximately 20 cc. per minute and a 1/8" packed analytical column was employed. The pyrolysis oven 74, to achieve best results, should have a capability maintaining temperatures within ±1° C. at any temperature up to 700° C. The oven 60 is not as critical and must be able to maintain temperature high enough to prevent sample condensation; usually above 200° C. is adequate in this respect.

In an illustrative operation of the pyrolytic identification apparatus in accordance with the method of this invention, the first switching valve 22 is in the position illustrated in FIG. 2 such that the eluent from the analytical column 46 is passed to vent 26. Suitable flow rates for the second and third flow streams 18 and 20 are established as described previously, i.e., high for the chromatograph and low for the pyrolysis tube 72. The temperatures of the several ovens 60, 74, and 80 as well as the several chromatograph ovens, not separately shown but considered as included within the dotted lines 10 and 14 (FIG. 2), are brought up to their desired optimum operating values. A one microliter sample is injected into the injection port 44 of the first flow system chromatograph by a microliter syringe.

When the first chromatograph detector 42 indicates by an increase in amplitude of the detector output signal, that the desired sample component, whose identity is required to be known, is being eluted, the first switching valve 22 is switched from the first position as illustrated in FIG. 2 to its second position as illustrated in FIG. 3. In this manner carrier gas plus separated sample components eluted from the first flow system 10 are passed into the delay loop 58. The carrier gas forming the second stream 19 is vented temporarily through vent 26. Just before the sample component to be identified is completely eluted, as denoted by the detector 42 output signal amplitude returning to its reference or zero level, or a corresponding peak on a recorder returning to baseline, the first valve 22 is returned back to its first switch position (FIG. 2). The regulated flow of the second flow stream 19, isolated from the first stream, directs the flow of the sample component stored in the delay loop 58 through the second switching valve 64 and the pyrolysis tube 72. The sample component stored in the delay loop 58 is in highly pure form and, since it was retained in vapor form, it may comprise a relatively small portion of the one microliter sample injected in the first flow stream (much smaller in fact than could have been injected accurately and easily into the pyrolysis tube as has been customary in prior systems).

Figure 4:
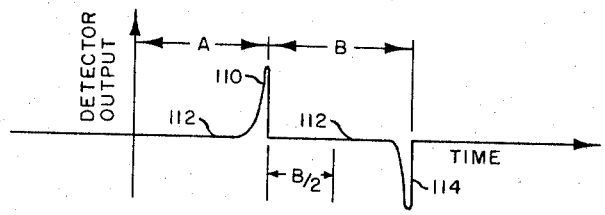
FIGURE 4 is a plot of the sample loop detector output signal amplitude plotted as a function of time to illustrate the manner in which the decomposition products may be stored for introduction into the third flow stream.

The flow through the pyrolysis tube 72 continues, the sample component being pyrolyzed, and the pyrolyzate, or thermal decomposition products, are passed through the pyrolyzate detector 76, value 81, sample loop 87, and back through the reference side of the second detector 76 to vent 28. The variations in the amplitude of the pyrolyzate detector 76 output signal as a function of time are observed. A typical plot of these variations is illustrated in FIG. 4 in which the detector output signal amplitude is plotted as a function of time. In FIG. 4, the initial time period A, until the occurrence of the first peak 110 is that indeterminate time required for the sample component initially stored in the delay loop 58 to pass through the pyrolysis tube 72 and to the analytical side of the detector 76 thereby producing a positive going peak 110. As the pyrolyzed sample component passes on through the second flow system 19, as described, the pyrolyzate detector 76 output signal remains at its quiescent or zero level 112 until the pyrolyzed sample component has passed into the sample loop and its earliest components have returned to the reference side of the detector 76. At this time a negative going deviation occurs in the amplitude of the detector 76 output signal as denoted by the peak 114.

The time B between the peaks 110 and 114 is the time required for the pyrolyzed sample component to pass completely into and through the sample loop 87, the six-port valve 81 and the associated tubing. It may now be easily determined that the time B/2 is that time required during which the pyrolyzed sample component is surely stored wholly within the sample loop 87. The fact that the detector 76 output signal remains at its reference level between the peaks 110 and 114, is an indication that all of the sample component has left the delay loop 58 and pyrolysis tube 72 and passed through the analytical side but has not reached the reference side of the detector 76.

Having thus initially determined the time required to store the pyrolyzed sample component in the sample loop 87, the heretofore described process is repeated for all subsequent runs using the same flow rates of the several flow streams. A sample to be identified is injected into the sample port 44, separated and the desired component pyrolyzed. Now when the first positive peak 110 (FIG. 4) is noted, the time interval B/2 is measured either by a suitable timing mechanism or by the operator. After the elapse of time B/2, the six-port switching valve 81 is switched from its first to its second position illustrated in FIG. 3. Carrier gas in the third flow stream 21, passing through the surge coil 96 flows through the sample loop 87 in the opposite direction and back-flushes the pyrolyzed sample component present in the sample loop 68. Such backflushing compresses the pyrolyzates and returns them to a more compact, slug-type sample for passage through the analytical column 100 of the third chromatograph or flow system 14. The surge coil 96 aids in the pyrolyzate compression and integration of the pyrolyzate into the third flow stream 21, which typically has a higher flow rate than the second flow stream and may be of different temperature and pressure. The extra volume at higher pressure provided by the surge coil 96 serves to damp out transistory flow rate fluctuations.

The flow rate through the pyrolysis tube 72 is relatively slow and at a low pressure so as to inhibit secondary reactions during pyrolysis. On the other hand, the flow rate in the third flow stream is a very high flow rate. When the extra pressure of the third flow stream 21 is introduced through the sample loop 87 for the backflush operation, the surge coil 96 acts as a reservoir so as to more quickly and with less flow disturbance adjust the flow in the sample loop 87 to that desired.

The pyrolysis products are separated in time by the second gas chromatograph 14 and detected.

The quantity of each of the decomposition products for a given sample component bears a predetermined or unique relation to the total quantity of decomposition products. This unique relationship exists substantially independent of sample size over at least two orders of magnitude as may be seen from the illustrative idealized plot of FIG. 6.

In FIG. 6 the peak area, or quantity of each of the separated decomposition products of a typical sample component is plotted against the total decomposition products quantity or peak area. In the plat, it is noted that the relationship between the quantity of each separated decomposition product and the total decomposition products (excluding the uncracked components) is a linear one. Hence for a given pyrolysis residence time and temperature, repeatable thermal cracking patterns are obtained which are substantially independent of sample size.

This relationship exists due to the unique method and system of this invention. Isolation of the three flow streams permits each of the first and last analytical chromatographs to operate under optimum conditions. In like manner, pyrolysis is permited to take place under its optimum parameters of temperature, pressure, and residence time. Since small sample sizes are facilitated, secondary pyrolysis reactions are avoided and pyrolysis is independent of sample size. Undue flow disturbances when switching samples between flow systems is averted by the use of the surge coil and flow regulators. The judicious backflushing of the sample loop in which the pyrolyzate is stored compresses and sharpens the peaks of the separated pyrolyzate component.

It will be obvious that various modifications may be made in the apparatus and in the manner of operating it. It is intended to cover such modifications and changes as would occur to those skilled in the art, as far as the following claims permit and as far as consistent with the state of the prior art.

What is claimed is:

1. A method of identifying at least one component of a sample mixture of components employing first and second chromatographic columns and a pyrolysis chamber comprising the steps of:
   introducing the sample mixture into a first flow stream,
   passing the first flow stream through the first chromatographic column to separate in time the sample components,
   introducing one of the separated sample components from said first stream into a second flow stream,
   passing said second flow stream containing said separated sample component through a pyrolysis chamber to pyrolyze said separated sample component and produce pyrolysis products,
   introducing the pyrolysis products from said second stream into a third flow stream,
   passing the third flow stream containing said pyrolysis products through the second chromatographic column to separate in time the pyrolysis products,
   and detecting changes in the constituency of said third flow stream.

2. The method set forth in claim 1 in which the step of introducing the pyrolysis products into said third flow stream includes the steps of:
   collecting all of the pyrolyzate products in a sample conduit interposed in said second flow stream, and
   positioning said sample conduit temporarily in said third flow stream.

3. The method set forth in claim 1 which includes the additional step of interconnecting said first stream and said second stream for a period of time sufficient to pass only one sample component into said third stream.

4. The method set forth in claim 1 which includes the additional step of reducing the pressure and flow rate of said second flow stream below that of said first and third flow streams to reduce thermal recombination reactions in said pyrolysis chamber.

5. The method set forth in claim 4 which includes the additional step of vaporizing said sample mixture prior to introduction into said first flow stream.

6. The method of identifying at least one component of a sample mixture comprising the steps of:
   introducing the sample mixture into a first independent flow stream,
   separating in time the components of the sample mixture,
   introducing one of the separated components into a second independent flow stream,
   thermally decomposing said one separated component to provide decomposition products,
   introducing the decomposition products into a third independent flow stream,
   separating the decomposition products in said third flow stream,
   and determining the quantity of each separated decomposition product to provide a thermal cracking pattern which is indicative of the identity of the sample component.

7. A system for the identification of at least one of the components of a sample comprising:
   first, second, and third independent conduit means each defining a fluid stream having individual flow parameters,
   means positioned in said first conduit means for introducing said sample into said first stream,
   first flow directing means connected to each of said first and second conduit means for introducing at least a portion of said first stream containing only one of said sample components into said second stream,
   means positioned in said second conduit means to pyrolyze at least a portion of said one sample component thereby to produce pyrolysis products, second flow directing means connected to each of said second and third conduit means for introducing at least a portion of said second stream containing said pyrolysis products into said third stream, and means connected to said third conduit means for detecting changes in the constituency of said third stream, thereby to identify said one component of said sample.

8. The system set forth in claim 7 wherein said means to pyrolyze includes:

an open non-catalytic tube, means to apply heat to said tube, and a first chromatograph separating column positioned in said first conduit means thereby to separate in time the components of said sample mixture.

9. The system set forth in claim 8 which also includes means to adjust the flow rate of said second stream thereby to optimize the residence time of said one sample component in said tube whereby to reduce the occurrence of secondary reactions among said pyrolysis products.

10. The system set forth in claim 8 which also includes:

means to adjust the flow rate of said second stream, thereby to optimize the residence time of said one sample component in said tube whereby to reduce secondary reactions from occurring among said pyrolysis products, a second chromatographic separating column positioned in said third conduit means, and means for passing said third stream through said second column thereby to separate in time the pyrolysis products.

11. The system set forth in claim 8 which also includes:

additional conduit means in said third conduit means for temporarily storing said pyrolysis products, means for passing said pyrolysis products in said second flow stream into said additional conduit means in a first sense, and means including said second flow directing means for passing said third stream through said additional conduit means in a second sense opposite said first sense, thereby to sweep said pyrolysis products into said third flow stream in slug form.

12. The system set forth in claim 8 which also includes:

additional conduit means disposed in said second conduit means upstream from said pyrolysis means and having a sufficient volume to store at least a portion of said first stream, thereby to store said one component of said sample in said additional conduit means prior to passage through said pyrolysis tube, whereby the first and second streams are isolated from each other.

13. The system set forth in claim 8 which also includes:

means to adjust the flow rate of said second stream thereby to optimize the residence time of said one sample component in said tube whereby to reduce the occurrence of secondary reactions among said pyrolysis products, a second chromatographic separating column disposed in said third conduit means, a means for passing said third stream through said second column thereby to separate in time the pyrolysis products, additional conduit means disposed in said third conduit means upstream of said second column for temporarily storing said pyrolysis products, means for passing said pyrolysis products from said second stream into said additional conduit means in a first sense, and means including said second flow directing means for passing said third stream through said additional conduit means in a second sense opposite said first sense thereby to introduce said pyrolysis products into said third stream in slug form.

14. The system set forth in claim 8 which also includes:

first additional conduit means disposed in said second conduit means having a sufficient volume to store at least a portion of said first stream, means including said first flow directing means for selectively passing said first stream into said first additional conduit means, thereby to store said one component of said sample in said first additional conduit means prior to passage through said pyrolysis tube, means to adjust the flow rate of said second stream thereby to optimize the residence time of said one sample component in said tube whereby to reduce the occurrence of secondary reactions among said pyrolysis products, second additional conduit means disposed in said third conduit means upstream of said second column for temporarily storing said pyrolysis products, means for passing said pyrolysis products from said second stream into said second additional conduit means in a first sense, means including said second flow directing means for passing said third stream through said second additional conduit means in a sense opposite said first sense thereby to introduce said pyrolysis products into said third stream, a second chromatographic separating column disposed in said third conduit means downstream of said second additional conduit means, and means for passing said third stream through said second column thereby to separate in time the pyrolysis products.

15. The system set forth in claim 8 which also includes:

a second chromatographic separating column positioned in said third conduit means, and means for passing said third stream through said second column thereby to separate in time the pyrolysis products.

16. The system set forth in claim 15 which also includes:

additional conduit means disposed in said third conduit means upstream of said second column for temporarily storing said pyrolysis products, means for passing said pyrolysis products in said second flow stream into said additional conduit means in a first sense, and means including said second flow directing means for selectively passing said third stream through said additional conduit means in a sense opposite said first sense thereby to separate said pyrolysis products in time.

17. A system for the identification of at least one of the components of a sample mixture comprising:

first, second, and third independent conduit means each defining a fluid stream having individual flow parameters, means positioned in said first conduit means for introducing said sample into said first stream, first flow directing means connected to each of said first and second conduit means for introducing at least a portion of said first stream containing at least one of said sample components into said second stream, means positioned in said second conduit means to pyrolyze at least a portion of said one sample component thereby to produce pyrolysis products, means to adjust the flow rate of said second stream thereby to optimize the residence time of said one sample component in said tube whereby to reduce the occurence of secondary reactions among said pyrolysis products, second flow directing means connected to each of said second and third conduit means for introducing at least a portion of said second stream containing said pyrolysis products into said third stream, first additional conduit means for temporarily storing said pyrolysis products, means for passing said pyrolysis products in said second stream into said first additional conduit means in a first sense, means including said second flow directing means for passing said third stream through said first additional conduit means in a second sense opposite said first sense thereby to sweep said pyrolysis products into said third stream, a chromatographic separating column, means for passing said third stream through said column thereby to separate in time the pyrolysis products, and means connected to said third conduit means for detecting changes in the constituency of said third stream, thereby to identify at least one component of said sample.

18. Apparatus for the qualitative identification of at least one of the components of a sample mixture comprising:

first, second, and third sources of carrier gas each having different flow parameters, first and second chromatograph separating columns, a pyrolysis chamber, first conduit means for supplying carrier gas from said first source to said first column, means connected in said first conduit means for introducing said sample into the carrier gas in advance of said first column, thereby to separate in said first column the sample in time into its components.

first valve means connected to each of said first column, said second source, and said pyrolysis chamber for alternatively supplying carrier gas from said second source and said first column to said pyrolysis chamber, thereby to thermally dissociate the molecules of at least one component of said sample into dissociation products, second valve means connected to each of said pyrolysis chamber, said third source, and said second column, for alternatively supplying carrier gas from the third source and said pyrolysis chamber to the third column, thereby to separate in time the dissociation products of said one component, and detector means connected to said second column to detect the dissociation products borne by said carrier gas from said third column, thereby to identify qualitatively said one component of said sample.

19. The apparatus set forth in claim 18 which also includes a delay chamber of predetermined volume interposed between said first valve means and said pyrolysis chamber thereby to store at least one component of said sample.

20. The apparatus set forth in claim 18 which also includes:

a sample chamber of known volumetric capacity and a vent, said second valve means including six ports and being positionable in a first position to interconnect certain pairs of said ports and in a second position to interconnect different pairs of said ports, said third source of carrier gas and said third column being connected to one pair of said certain pairs of ports, said pyrolysis chamber and said sample chamber being connected to another pair of said certain pairs of ports, said vent and said sample chamber being connected to the third pair of said certain pairs of ports.

21. The apparatus set forth in claim 20 wherein said sample chamber comprises an open tubular conduit of sufficient volume to store substantially all of said dissociation products.

22. The apparatus set forth in claim 20 wherein said pyrolysis chamber comprises an open noncatalytic quartz tube.

References Cited

UNITED STATES PATENTS

| 2,180,847 | 11/1939 | Nordell | 23—253 |
| 3,236,603 | 2/1966 | Durret et al. | 23—254 |
| 3,304,159 | 2/1967 | Hinsuark. | |

MORRIS O. WOLK, *Primary Examiner.*

E. A. KATZ, *Assistant Examiner.*

U.S. Cl. X.R.

23—230, 254; 55—67, 386; 73—23.1